United States Patent Office 2,948,629
Patented Aug. 9, 1960

2,948,629

IMPACT-RESISTANT CERAMICS FROM SYNTHETIC FLUORAMPHIBOLES AND PROCESSES OF MAKING SAME

Haskiel R. Shell, Norris, Tenn., assignor to the United States of America as represented by the Secretary of the Interior No Drawing. Filed June 4, 1958, Ser. No. 739,947

5 Claims. (Cl. 106—39)

(Granted under Title 35, U.S. Code (1952), sec. 266)

The invention herein described and claimed may be manufactured and used by or for the Government of the United States of America for governmental purposes without the payment of royalties thereon or therefor.

This invention relates to synthetic fluoramphiboles, to the methods of making the same, and to articles of manufacture made therefrom.

Ceramic materials, although having nearly perfect elasticity as a result of strain being directly proportional to the applied stress, soon reach their elastic limit with resultant rupture. They are therefore relatively poor in resistance to such forces as sudden blows or mechanical stresses. Improvement in impact-resistance of ceramics, while retaining other desirable properties, is the object of intensive research.

In many materials strength may be supplemented or obtained by the introduction of a strong reinforcing agent which usually has a high length to cross-section ratio and which bonds to the matrix. Examples of this are steel rods in concrete and glass fiber in plastics. With ceramics, however, this practice is limited, for any reinforcing agent must not be deleterious to the desired properties of the final product. Additionally, at the temperatures involved in formation of a ceramic the additive usually reacts with the matrix to give an inferior and undesirable end product.

According to my invention, superior ceramic products may be prepared from novel fluoramphiboles in the form of fine interlocking acicular crystals. The fluoramphibole employed may be of one composition, or may be a mixture of isomorphs, and can be prepared by hot-pressing a solid-state reaction product, hot-pressing a mixture of raw materials, or from a melt.

It is an object of this invention to produce a ceramic composition of matter which may be fabricated into hard, tough, and impact resistant ceramic having good dielectric properties, high heat resistance, good chemical stability, high transverse strength and low porosity.

Another object of this invention is to provide a method for producing fluoramphibole ceramics without the use of extraneous bonding agents.

A further object of this invention is to produce ceramic articles of high impact strength at comparatively low processing temperatures.

Further objects and advantages of the invention will appear from the following description.

Amphiboles are a family of chemically and structurally related inorganic crystalline compounds having the general formula $$W_{0-1} \cdot X_2 \cdot Y_5 \cdot (Z_4O_{11})_2 \cdot (OH,F)_2$$

W refers to univalent cations in 12 fold coordination with oxygen, i.e., is surrounded by 12 not necessarily equidistant oxygen ions. The W position may be vacant, or occupied by sodium (Na$^+$) or lithium (Li$^+$). X refers to univalent or divalent cations in 8 fold coordination with oxygen. The X position is usually occupied by sodium (Na$^+$) and/or calcium (Ca$^{++}$), but may be occupied completely or partially by manganese (Mn$^{++}$), magnesium (Mg$^{++}$), cadmium (Cd$^{++}$), and strontium (Sr$^{++}$). Y refers to divalent or trivalent cations in 6 fold coordination with oxygen, or with oxygen and fluoride (or hydroxyl). The Y position is usually occupied by magnesium, but may be partially substituted by aluminum (Al$^{+++}$), cobalt (Co$^{++}$), copper (Cu$^{++}$), iron (Fe$^{+++}$ or Fe$^{++}$), lithium (Li$^+$), manganese (Mn$^{++}$), or nickel (Ni$^{++}$). Z refers to small and/or highly charged cations in 4 fold coordination with oxygen and is usually silicon (Si$^{++++}$), but may be partially replaced by aluminum (Al$^{+++}$) or boron (B$^{+++}$).

O refers to the oxygen anion (O=), OH to the hydroxyl anion (OH$^-$) commonly present in natural amphiboles. F refers to the fluoride anion (F$^-$) which completely replaces hydroxyl in the synthetic amphibole product of this invention, so that the formula becomes $$W_{0-1} \cdot X_2 \cdot Y_5 \cdot (Z_4O_{11})_2 \cdot F_2$$

The basic unit of building block of the amphiboles is the $(ZO_4)^{4-}$ tetrahedron where Z is usually silicon but may vary as described. These are linked together in the form of double chains which in turn are bonded together by the W, X, and Y cations.

The fluoride anion is an indispensable component since it not only enters the structure making possible the formation of amphiboles rather than pyroxenes, but it also gives the necessary heat stability to the product. Natural amphiboles which are ordinarily obtained in fibrous condition but which also largely have hydroxyl ions rather than fluoride ions, cannot be used because of decomposition with loss of water, resulting in a non-coalescing powder. More than a stoichiometric ratio of F$^-$ may be found useful in hastening the reaction or in giving a more suitable product for some applications. Up to three times the normal amount may be used.

An essential feature of this invention is that the fluoramphibole is obtained as a mass of interlocking small crystals. Ceramics made from fluoramphiboles having large crystalline structure lack the desired mechanical strength.

Masses of small interlocking crystals of fluoramphiboles may be obtained by melting together the necessary raw materials, as for example LiF, CaCO$_3$, MgO, SiO$_2$, and cooling rapidly enough to insure formation of small crystals. Another method of obtaining the interlocking crystallization is to react the well mixed and finely divided raw materials under pressure at some suitable temperature for the composition. This reaction under heat and pressure is known as hot-pressing. Alternately and preferably, the raw materials are reacted at some suitable temperature in the solid state under conditions minimizing volatilization; then the solid-state reacted fluoramphibole is hot-pressed to its final shape yielding a ceramic body which is strong and impact-resistant. A suitable temperature is one below the melting temperature, yet high enough to give a low porosity product; it will be different for different compositions.

This invention will appear more clearly from the following examples.

*Example 1*

A mixture of 212 grams sodium silicofluoride, 119 grams sodium carbonate, 225 grams calcium carbonate, 657 grams magnesium hydroxide and 225 grams calcium carbonate, 657 grams magnesium hydroxide and 1014 grams of 230 mesh silica sand is reacted in a sealed fire clay crucible at 980° C. for 16 hours. This solid state reacted material consists almost entirely of microscopic needles of a fluoramphibole known as fluor-richterite having the formula Na·NaCa·Mg$_5$·(Si$_4$O$_{11}$)$_2$·F$_2$. The sintered mass is then pulverized, and a portion transferred to a graphite die and heated at 1050° C. under a pressure of 1000 pounds per square inch for 1 hour. The resulting product has an impact strength from 2 to 7 times higher than that of ceramics such as steatite or glass-bonded mica. Its modulus of rupture is 15000–17000 p.s.i., and the density is 2.86. At one megacycle and 25° C., the dielectric constant is 6.0 and power factor, 0.002. X-ray analysis shows fluoramphibole to be the only major constituent of the product. Microscopically, the product consists essentially of very fine acicular crystals with 1% in the form of a glass.

*Example 2*

A composition consisting of 14 grams $Na_2SiF_6$, 6 grams NaF, 15 grams $CaCO_3$, 44 grams $Mg(OH)_2$, and 63 grams $SiO_2$ (dehydrated silicic acid) is mixed thoroughly and then hot-pressed directly at 1500 p.s.i., 1000° C., 1 hour. The resulting product corresponding to the formula $Na \cdot NaCa \cdot Mg_5 \cdot (Si_4O_{11})_2 \cdot F_2$, is dense, non-porous, and has an impact strength of from 2 to 5 times that of glass-bonded mica or steatite. The dielectric constant is 6.9, and the power factor 0.0011 at 1 megacycle and 25 C. The product consists almost entirely of interlocking microscopic needles of fluoramphibole.

*Example 3*

A mixture of 53 grams of sodium carbonate, 200 grams calcium carbonate, 62 grams magnesium fluoride, 26 grams lithium fluoride, 121 grams magnesium oxide and 481 grams of 200 mesh silica sand is melted in a graphite crucible and then cooled at a rapid rate. The resulting product, corresponding to the formula $$Na \cdot Ca_2 \cdot Mg_4Li \cdot (Si_4O_{11})_2 \cdot F_2$$

is a dense tough, hard fluoramphibole, very resistant to breaking.

Instead of the carbonates and hydroxides, the oxide, or other salts which yield oxides on calcining may be employed, such as the nitrates.

The different compositions falling within the scope of the generic formula require different conditions for optimum results, which must be determined experimentally in each case. Two or more fluoramphibole isomorphs, prepared as by the solid state reaction method of Example 1, may be mixed together and hot-pressed in a die to obtain products having properties dependent on the identity and relative amounts of the individual components.

It is to be understood that the examples given are merely illustrative and do not exhaust the classes of compounds falling within the scope of the generic invention.

The ceramics obtained are more resistant to impact than any developed to date having a forming temperature of 900° to 1100° C. Although fabrication is at a relatively low temperature, the products are heat resistant to as high as 800° to 900° C. Having a Knoop indentation hardness in the range of 550 to 650 with a 100 grams load, equivalent to 6–7 on the Mohs' scale, they possess adequate abrasion resistance for most uses. They are tough and have high transverse strength, ranging up to 21000 p.s.i. Discs 3 to 4 mm. thick and 2 inches in diameter may be dropped onto a concrete floor from a height of several feet without breakage. Because of the interlocking crystalline structure, the strength properties are developed throughout the body rather than just on the surface, as in tempered glass for example. Since the fluoramphibole is a synthetic mineral capable of extensive isomorphism the composition may be varied, depending on the end properties required, such as dielectric properties, resistance to abrasion, etc. In contrast to naturally occurring minerals, the purity may be readily controlled and the excellent dielectric porperties are thereby readily reproducible and easily controlled.

I claim:
1. A ceramic article of manufacture consisting essentially of intermeshing fine acicular fluoramphibole crystals having the formula $W_{0-1} \cdot X_2 \cdot Y_5 \cdot (Z_4O_{11})_2 \cdot F_2$ wherein W is selected from the class consisting of $Na^+$ and $Li^+$ and mixtures thereof, X is selected from the class consisting of $Na^+$, $Ca^{++}$, $Mn^{++}$, $Mg^{++}$, $Cd^{++}$, and $Sr^{++}$ and mixtures, thereof, Y is selected from the class consisting of $Mg^{++}$ and mixtures of $Mg^{++}$ with at least one member of the class consisting of $Al^{+++}$, $Co^{++}$, $Cu^{++}$, $Fe^{++}$, $Fe^{+++}$, $Li^+$, $Mn^{++}$, and $Ni^{++}$, Z is selected from the class consisting of $Si^{++++}$ and mixtures of $Si^{++++}$ with at least one member of the class consisting of $Al^{+++}$ and $B^{+++}$, said article being prepared by hot-pressing under elevated pressure and temperature a composition selected from the group consisting of sintered fluoramphibole of the above formula, and precursor unreacted ingredients thereof consisting of predetermined quantities of silica and compounds selected from the group consisting of fluorides, silicofluorides, oxides and compounds convertible to oxides under calcining conditions, of the said elements W, X, Y, and Z, to form a dense, non-porous, high impact strength product having the said formula.

2. A method of forming a ceramic article of manufacture having the formula $Na \cdot Ca_2 \cdot Mg_4Li \cdot (Si_4O_{11})_2 \cdot F_2$, which comprises admixing a predetermined quantity of compounds of the elements Na, Ca, Mg, and Li selected from the classes consisting of fluorides, silicofluorides, oxides and compounds convertible to oxides under calcining conditions together with silica, heating said mixture in a vessel to a temperature sufficient to form a melt and then cooling rapidly, to form a dense, non-porous, high impact strength article of intermeshed fine acicular crystals of the said formula, and removing the article from the vessel as a product of the process.

3. A ceramic article of manufacture consisting essentially of intermeshing fine acicular crystals having the formula $Na \cdot Ca_2 \cdot Mg_4Li \cdot (Si_4O_{11})_2 \cdot F_2$.

4. A method of forming a ceramic article of manufacture having the formula $Na \cdot Ca_2 \cdot Mg_4Li \cdot (Si_4O_{11})_2 \cdot F_2$, which comprises admixing a predetermined quantity of sodium carbonate, magnesium fluoride, lithium fluoride, magnesium oxide and silica, heating said mixture to a temperature sufficient to form a melt and then cooling rapidly to form an article having the same formula.

5. A ceramic article of manufacture consisting essentially of intermeshing fine acicular crystals having the formula $Na \cdot NaCa \cdot Mg_5 \cdot (Si_4O_{11})_2 \cdot F_2$, said article being prepared by hot-pressing under elevated pressure and temperature a sintered mass of fluoramphibole of the said formula to form a dense, non-porous, high impact strength product.

References Cited in the file of this patent

UNITED STATES PATENTS 2,675,853    Hatch et al. _____ Apr. 20, 1954

FOREIGN PATENTS 524,214    Great Britain _____ Aug. 1, 1940

OTHER REFERENCES

Shell et al.: Bureau of Mines Report 5417 (1958), "Synthetic Asbestos Investigations" (35 pages).

Comeforo and Kohn: Amer. Mineralogist, vol. 39, 1955 (pages 537–542).

Kohn and Comeforo: Amer. Mineralogist, vol. 40, 1955 (pages 410–412 and 419–421).